Jan. 27, 1925.  
J. N. WHITEHOUSE  
1,524,644  
DOLL'S HEAD  
Filed April 9, 1924 2 Sheets-Sheet 1
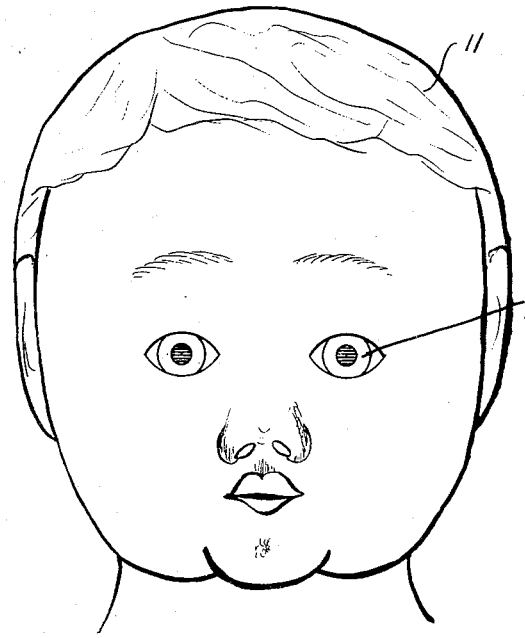
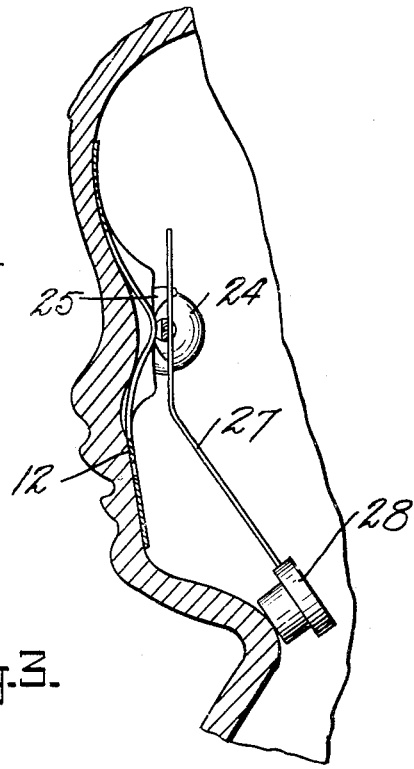
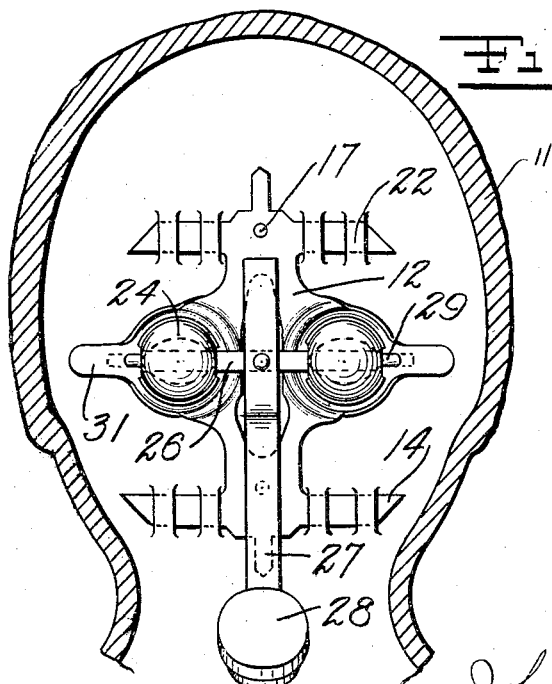
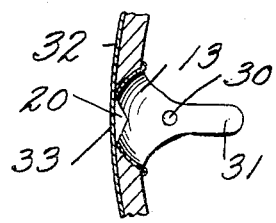
John W. Whitehouse INVENTOR  
BY Frank J. Hent ATTORNEY Jan. 27, 1925.  1,524,644
J. N. WHITEHOUSE
DOLL'S HEAD
Filed April 9 1924   2 Sheets-Sheet 2
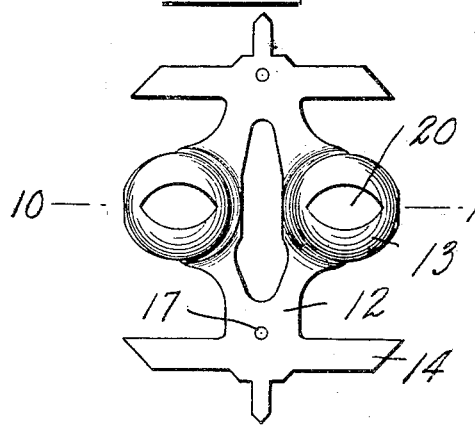
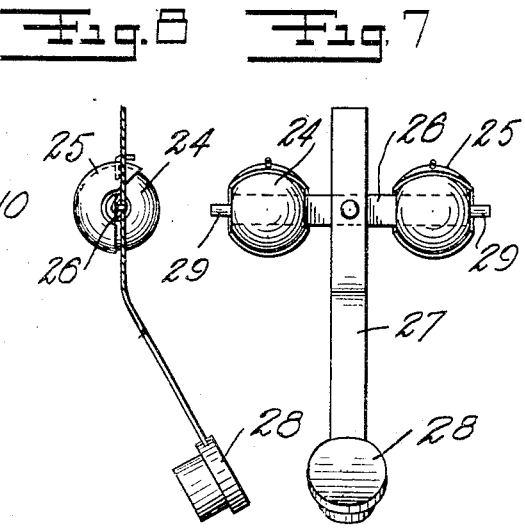
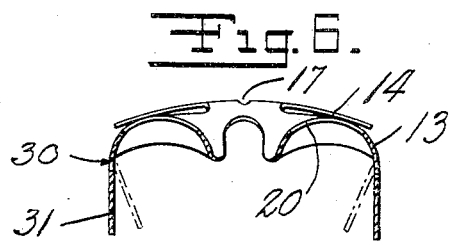
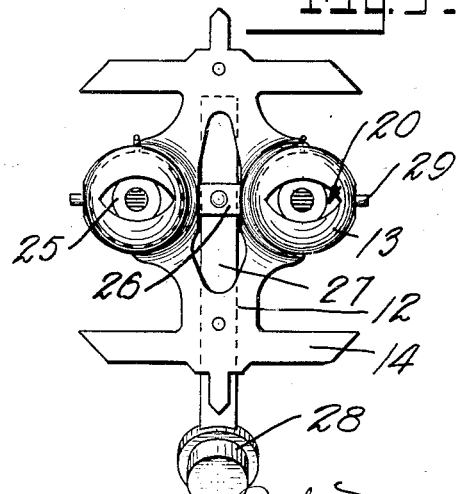

Patented Jan. 27, 1925.

1,524,644

UNITED STATES PATENT OFFICE.

JOHN N. WHITEHOUSE, OF NEW YORK, N. Y.

DOLL'S HEAD.

Application filed April 9, 1924. Serial No. 705,163.

*To all whom it may concern:*

Be it known that I, JOHN N. WHITE-HOUSE, a citizen of the United States, residing at New York, in the county of New York and State of New York, have invented certain new and useful Improvements in Dolls' Heads, of which the following is a specification.

This invention relates to a method of mounting movable eye elements in doll heads and to an improved structural mounting of the eye elements in connection with which the method is used.

In the manufacture of doll heads provided with movable eyes as heretofore conducted the varying effects of shrinkage on the molded material produced variations in the distances between and in the relative positions of the eye holes or sockets so that the eye elements could not be placed in position without special and particular adjustment of each eye member with relation to the other and to the socket or opening in which it was seated. The result has been that the operation of seating the eye elements has required special skill and a relatively expensive hand operation which has added more than a proportionate share to the cost of production of the heads.

Another objectionable feature of the prior methods of construction has resided in the mounting of the eye-supporting framework in the head. This has consisted in the employment of glue to hold the wire parts of the framework in place and this has been unsatisfactory in the wasteful period of time required for the glue to properly set.

In the present invention I avoid the objectionable features referred to by embedding and anchoring in the plastic material of which the head is formed, and in the same forming operation in which the head is made, a sheet metal eye member support provided with preformed eye socket members that penetrate the material of the head shell at invariably the proper relative positions to receive a pair of eye ball members which are mounted to center accurately in the socket members without requiring any individual or special adjustment whatever. By the simple bending of a pair of lateral wing members on the anchored support to provide bearing members in which the opposite extremities of a pintle rod extending transversely through the eye members are journaled, the assembly is completed with a minimum expenditure of time and with a minimum requirement for skill in workmanship.

An additional and important feature of the invention resides in the maintaining of a fixed and unchanging distance between the eye members because of the overcoming of shrinkage and other distorting effects.

Other features of the invention will be hereinafter referred to.

In the drawings in which a preferred embodiment of the invention has been selected for illustration, Figure 1 is a view in front elevation of a doll head having an eye construction embodying the invention.

Figure 2 is a view in vertical section of the forward portion of the device shown in Figure 1.

Figure 3 is a vertical section taken at right angles to Figure 2.

Figure 4 is a sectional view showing an eye socket portion in detail.

Figure 5 is a view in front elevation of a sheet metal eye socket member forming part of the invention.

Figure 6 is a view in horizontal section taken on the line 10—10 of Figure 5.

Figure 7 is a view in rear elevation of eye elements and a supporting structure therefor.

Figure 8 is a view in vertical section of the parts shown in Figure 7.

Figure 9 is a view in front elevation of the devices shown in Figures 5 and 7 in assembled relation.

Referring to the drawings for a more detailed description of the invention, a doll head is shown at 11 equipped with eye elements which are mounted and supported in position in the eye sockets in the doll head in accordance with the invention hereinafter described.

In Figure 5 of the drawings there is shown a supporting member 12 provided with bowl-shaped eye socket members 13 which are formed in the structure of the frame or supporting member 12 in fixed and immovable relation to each other and at the precise distance apart which accords with the particular distance separating the eye members which are to be later mounted therein. In addition the frame or supporting member 12 is provided with laterally extending anchoring members 14 which are arranged to be embedded in the material of which the head is formed to thereby securely hold the supporting member 12 in a permanent and fixed position in the doll head of which it forms a part.

In Figures 7 and 8 of the drawing there is shown a special structure which supports the eye ball elements 24, each of which is fitted with a partially globular shell 25 having the visible portions of the eye represented, thereon. The eye ball elements 24 are mounted on a relatively rigid transversely extending bar 26. The eye ball members are placed at a fixed distance apart on the bar, the distance being such as to accord precisely with the distance apart of the eye openings 20 in the socket members 13. A vertically extending bar 27 provided with a seat 28 at its lower end is attached to the transverse bar 26 at a middle part thereof and serves to swing the eye ball members to the eye opening and closing positions as will be understood. The opposite outer extremities of the transverse bar 26 are provided with rounded sections 29 which are adapted to be journaled in openings 30 formed in laterally extending wing members 31 projecting from the outer edges of the eye socket members 13 in the frame member 12. In assembling the eye ball members in their position in the socket members the structure shown in Figure 7 of the drawing is placed in position against the rearward face of the frame member 12 with the eye ball members 24 seated in the sockets 13 whereupon the wing members 31 are bent rearwardly as is indicated in Figure 6 of the drawing to cause the end sections 29 of the transverse bar 26 to pass through the openings 30 and produce an assembly of parts such as is shown in front elevation in Figure 9 of the drawing. The bending of the wing members 31 in which the transverse bar 26 is journaled can be utilized to provide any slight adjustment of the parts that may be needed and it will be seen that this extremely simple method of adjustment can be quickly and readily accomplished so that the cost of assembling the eye elements in accordance with the method described greatly reduces the cost of this operation over the corresponding operations in the prior art. Not only is the cost of assembling greatly reduced but the uniform and precise placing of the eye elements in the eye openings 20 is a substantial advantage over the prior method of operation wherein considerable difficulty was found in mounting the eye elements so that they would have a natural appearance.

Following the taking of the head from the mold it is the practice to apply to the outer surface of the head a film of material 32 which also covers the eye openings 20 as at 33 so that prior to the mounting of the eye ball members in position that section 33 of the film which covers the eye openings 20 is pushed through the eye openings from the outside, this simple procedure leaving the outer edges of the eye sockets 13 in such close adjacency to the outer surface of the head that the eye ball members take a natural position therein and do not have the sunken and unnatural appearance frequently encountered in the prior art.

What is claimed is:

1. In an eye construction for doll heads, a relatively elongated supporting member formed of sheet metal, laterally extending arms on the upper and lower ends of said member, said arms forming the securing means whereby the said supporting member is mounted within the doll head, and a pair of integrally formed eye sockets intermediate the laterally extending arms, each socket being formed with a uniform concave surface to flushly engage about the eye opening in the doll head.

2. In an eye construction for doll heads, a supporting member formed of sheet metal and having laterally extending arm portions constructed and arranged to be anchored to the material forming the head, immovably related eye socket portions formed in the supporting member intermediate the laterally extending arms and arranged to be seated in the eye openings in the doll head, wing members on the lateral edges of said supporting member, said wing members being provided with openings, a transversely extending bar journaled at its ends in the openings in said wing members, a pair of eye elements mounted in relatively immovable relation on said bar and arranged to seat in said socket portions, and a vertically extending bar attached to said transversely extending bar between the eye elements and provided with a weight member at its lower end.

3. In an eye construction for doll heads, a relatively elongated supporting member formed of sheet metal, means for securing the upper and lower ends of said member within the doll head, and a pair of integrally formed eye sockets intermediate the upper and lower ends of the supporting member, each socket being formed with a uniform concave surface to flushly engage about the eye opening in the doll head.

4. A head for dolls formed of molded material and having a pair of concave eye openings therein, and a reinforcement for the eye openings consisting of a unitary sheet metal blank secured in immovable relation to the doll head, said blank having a pair of uniformly concaved sockets formed therein and adapted to be snugly received within the eye openings in the doll head.

In testimony whereof I affix my signature.

JOHN N. WHITEHOUSE.